(12) United States Patent
Wei et al.

(10) Patent No.: US 11,432,221 B2
(45) Date of Patent: Aug. 30, 2022

(54) CELL RESELECTION FOR AN AERIAL UE

(71) Applicant: Sony Corporation, Tokyo (JP)

(72) Inventors: Yuxin Wei, Basingstoke (GB); Vivek Sharma, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 79 days.

(21) Appl. No.: 16/960,093

(22) PCT Filed: Jan. 9, 2019

(86) PCT No.: PCT/EP2019/050426
§ 371 (c)(1),
(2) Date: Jul. 6, 2020

(87) PCT Pub. No.: WO2019/137949
PCT Pub. Date: Jul. 18, 2019

(65) Prior Publication Data
US 2021/0068028 A1 Mar. 4, 2021

(30) Foreign Application Priority Data
Jan. 11, 2018 (EP) .................................... 18151273

(51) Int. Cl.
*H04W 36/00* (2009.01)
*H04W 36/32* (2009.01)
*H04W 76/30* (2018.01)
*B64C 39/02* (2006.01)
*H04W 36/08* (2009.01)

(52) U.S. Cl.
CPC ........... *H04W 36/32* (2013.01); *B64C 39/024* (2013.01); *H04W 36/08* (2013.01); *H04W 76/30* (2018.02)

(58) Field of Classification Search
CPC ..... H04W 36/32; H04W 36/08; H04W 76/30; B64C 39/024
See application file for complete search history.

(56) References Cited

U.S. PATENT DOCUMENTS

2012/0015653 A1* 1/2012 Paliwal ................. H04W 24/10
455/435.1
2017/0311217 A1* 10/2017 Jung ................. H04W 36/00835
2018/0247544 A1* 8/2018 Mustafic .............. G08G 5/0039
2018/0302760 A1* 10/2018 Liu ........................ H04W 76/27
(Continued)

FOREIGN PATENT DOCUMENTS

GB 2512377 A * 10/2014 ........ H04W 36/0061
WO 2013/162277 A1 10/2013
(Continued)

OTHER PUBLICATIONS

International Search Report and Written Opinion dated Mar. 6, 2019 for PCT/EP2019/050426 filed on Jan. 9, 2019, 13 pages.
(Continued)

*Primary Examiner* — Khai M Nguyen
(74) *Attorney, Agent, or Firm* — Xsensus LLP

(57) ABSTRACT

An infrastructure equipment comprising circuitry configured to transmit to a user equipment an RRC connection release message including assistance information for cell selection/reselection, the assistance information being based on location information.

18 Claims, 8 Drawing Sheets

(56) References Cited

U.S. PATENT DOCUMENTS

| | | | |
|---|---|---|---|
| 2019/0045416 A1* | 2/2019 | Hwang | H04W 76/28 |
| 2019/0069328 A1* | 2/2019 | Sharma | H04W 72/085 |
| 2021/0195479 A1* | 6/2021 | Wei | H04W 36/0055 |

FOREIGN PATENT DOCUMENTS

| | | |
|---|---|---|
| WO | 2015/139666 A1 | 9/2015 |
| WO | 2015/195009 A1 | 12/2015 |
| WO | 2019/101837 A1 | 5/2019 |

OTHER PUBLICATIONS

3GPP, "3rd Generation Partnership Project; Technical Specification Group Radio Access Network; Radio Resource Control (RRC); Protocol specification," Release 12, 3GPP TS 25.331 V12.12.0, Dec. 2016, 2230 pages.

Deutsche Telekom, "Our view on the "Chiba issue"—RACH access failure," 3GPP TSG RAN WG2 No. 82, R2-131654, Fukuoka, Japan, May 20-24, 2013, 2 pages.

Ericsson (Rapporteur), "Summary on [99b#61][LTE/UAV] Identify potential solutions on mobility enhancement," 3GPP TSG-RAN WG2 No. 100, R2-1713451, Reno, Nevada, USA, Nov. 27-Dec. 1, 2017, 23 pages.

Huawei, et al., "Identification of air-borne drones," 3GPP TSG-RAN WG2 Meeting No. 98, R2-1705000, Hangzhou, China, May 15-19, 2017, 3 pages.

Kyocera, et al., "Considerations for cell selection and reselection with UAVs," 3GPP TSG-RAN WG2 No. 99bis, R2-1710796, Prague, Czech Republic, Oct. 9-13, 2017, pp. 1-3.

Lenovo, et al., "Discussion for status management for aerial UE," 3GPP TSG-RAN WG2 Meeting No. 100, R2-1713314, Revision of R2-1711379, Reno, USA, Nov. 27-Dec. 1, 2017, pp. 1-3.

* cited by examiner

```
RRCConnectionRelease
  └ ReleaseCause
  └ RedirectedCarrierInformation
  └ IdleModeMobilityControlInformation
        └ ..
        └ CellSelectAssistenceInfo
        └ ..
  └ CellInformationList
  └ ExtendedWaitTime
```

Fig. 3

```
IdleModeMobilityControlInformation
  └ E-UTRA-FrequencyPriorityList
  └ GERAN-FrequencyPriorityList
  └ FDD-UTRA-FrequencyPriorityList
  └ TDD-UTRA-FrequencyPriorityList
  └ HRPD-CDMA2000-BandClassPriorityList
  └ 1xRTT-CDMA2000-BandClassPriorityList
  └ CellSelectAssistenceInfo
```

Fig. 4

```
CellSelectAssistenceInfo
 L BaseStation1
   L cellID
   L latitude
   L longitude
   L Height
 L BaseStation2
   L cellID
   L latitude
   L longitude
   L Height
 L BaseStation3
   L cellID
   L latitude
   L longitude
   L height
```

Fig. 5

CELL RESELECTION FOR AN AERIAL UE

CROSS-REFERENCE TO RELATED APPLICATIONS

The present application is based on PCT filing PCT/EP2019/050426, filed Jan. 9, 2019, which claims priority to EP 18151273.2, filed Jan. 11, 2018, the entire contents of each are incorporated herein by reference.

TECHNICAL FIELD

The present disclosure generally pertains to entities and user equipment of a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so called Long Term Evolution ("LTE"), which is a wireless communication technology allowing high-speed data communications for mobile phones and data terminals and which is already used for 4G mobile telecommunications systems. Other candidates for meeting the 5G requirements are termed New Radio Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project"). There exists a successor LTE-A (LTE Advanced) allowing higher data rates as the basis LTE which is also standardized under the control of 3GPP.

For the future, 3GPP plans to further develop LTE-A, such that it will be able to fulfill the technical requirements of 5G. As the 5G system will be based on LTE or LTE-A, respectively, it is assumed that specific requirements of the 5G technologies will, basically, be dealt with by features and methods which are already defined in the LTE and LTE-A standard documentation.

Current technical areas of interest to those working in the field of wireless and mobile communications are known as the "Internet of Things", or IoT for short, and "Machine to Machine Communication" (M2M), or Machine Type Communication (MTC). The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network.

Unmanned Aerial Vehicles (UAV), more commonly referred to as "Drones", are aircrafts that operate with various degrees of autonomy, e.g. under remote control by a human operator or autonomously by onboard micro controller. The remote control of drones may be based on a usage of cellular networks in a regulatory manner. Consequently, a support of cellular communication could be foreseen for drones. A drone may carry a legal UE, which is certified for aerial usage, or, alternatively, a drone may carry a UE that is only certified for terrestrial operation, e.g. a smart phone.

According to 3GPP TSG-RAN WG2 Meeting #98, R2-1705000, Hangzhou, China, 15-19 May 2017, it has been agreed that both command and control and application data of drones using LTE connectivity are within the scope of the system information (SI).

According to 3GPP TSG-RAN R2-1710796 ("Considerations for cell selection and reselection with UAVs"), WG2 Meeting #98, Hangzhou, China, 15-19 May 2017, once an aerial vehicle is flying well above the BS antenna height, the UL signal from the aerial vehicle becomes more visible to multiple cells due to line-of-sight propagation conditions. The UL signal from an aerial vehicle increases interference in the neighbouring cells. R2-1710796 thus proposes that there should be an option for cells to configure system information with cell selection/reselection related system information specifically for aerial UEs.

According 3GPP TSG-RAN R2-1713451, WG2 Meeting #100—Reno, Nev., USA from the 27 Nov.-1 Dec. 2017 a flying path plan is proposed and discussed. The flying path plan is the aerial UEs planned flying route especially in autopilot flying mode. Such kind of information can help directional handover, and also help for cell (re)-selection when aerial UE in IDLE mode.

If LTE connectivity and/or NR would be used for the purpose to provide a UAV with command and control, the UAV should be in RRC connected mode in most of case. The average number of detectable cells and range of detected cells (km) per height changes depending on height. Drone UEs experience less handovers than ground UEs and drone UEs experienced less radio link failures than ground UEs. But increasing number of visible cells should cause significant interference with communications between eNBs and terrestrial UEs In view of this background, an efficient RRC connection management for aerial UEs mitigating interference with terrestrial UEs is needed.

SUMMARY

According to a first aspect the disclosure provides an infrastructure equipment comprising circuitry configured to transmit to a user equipment an RRC connection release message including assistance information for cell selection/reselection, the assistance information being based on location information.

According to a further aspect the disclosure provides an electronic device comprising circuitry configured to receive and store assistance information for cell selection/reselection in an RRC connection release message, the assistance information being based on location information.

According to a further aspect the disclosure provides a method comprising transmitting or receiving an RRC connection release message including assistance information for cell selection/reselection, the assistance information being based on location information.

Further aspects are set forth in the dependent claims, the following description and the drawings.

BRIEF DESCRIPTION OF THE DRAWINGS

Embodiments are explained by way of example with respect to the accompanying drawings, in which:

FIG. 3 shows an embodiment of an RRCConnectionRelease message including CellSelectAssistenceInfo to allow a positioning based cell selection;

FIG. 4 shows an embodiment in which the CellSelectAssistenceInfo is contained in the IE idleModeMobilityControlInfo;

FIG. 5 shows an embodiment of assistance information for cell selection that is transmitted in a RRCConnectionRelease message from a base station;

DETAILED DESCRIPTION OF EMBODIMENTS

Figure 1:
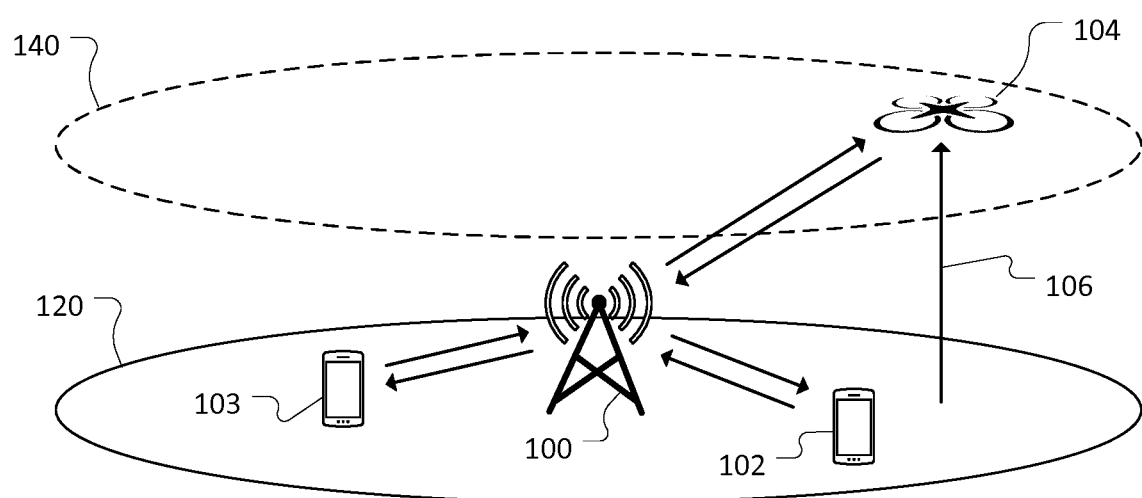
FIG. 1 shows an embodiment in which an eNB that is designed based on currently deployed base stations for cellular systems builds a different type of cell coverage ("areal cell coverage") for aerial UEs in addition to the normal cell coverage for terrestrial UEs.

The embodiments disclose an infrastructure equipment comprising circuitry configured to transmit to a user equipment an RRC connection release message including assistance information for cell selection/reselection, the assistance information being based on location information.

The infrastructure equipment may also be referred to as a base station, network element such as an entity of a core network, an enhanced Node B (eNodeB, or eNB) or a coordinating entity for example, and may provide a wireless access interface to one or more communications devices within a coverage area or cell. The infrastructure equipment may for example be any entity of a telecommunications system, e.g. an entity of a New Radio Access Technology Systems.

A User Equipment (UE) may be any device that is related to an end-user or to a terminal to communicate in e.g. a Universal Mobile Telecommunications System (UMTS) and 3GPP Long Term Evolution (LTE, or aLTE) system. The UE may support the New Radio Access Technology Systems in addition to the legacy system such as LTE, and other advancements.

An aerial UE may for example be an UE that is provided in, on or at an aerial vehicle. An aerial device may for example be an Unmanned Aerial Vehicles (UAV) (a "Drone"), or aircrafts that operate with various degrees of autonomy, e.g. under remote control by a human operator or autonomously by an onboard micro controller. An aerial UE may be a mobile communications device that is configured to communicate data via the transmission and reception of signals representing data using a wireless access interface. In the context of this application, the term aerial UE is also used for an electronic device that is autonomously or semi-autonomously operating in an aerial device, without the operator (or "user") of the device being required to be located at or close to the device. The term User Equipment (UE) thus also relates to equipment where the user is located remote to the equipment.

Circuitry of an infrastructure equipment may include at least one of: a processor, a microprocessor, a dedicated circuit, a memory, a storage, a radio interface, a wireless interface, a network interface, or the like, e.g. typical electronic components which are included in a base station, such as an eNodeB.

The RRC connection release message transmitted by the infrastructure equipment may for example be any radio resource control message that commands the release of an RRC connection.

Cell selection may relate to initial access of an aerial UE or terrestrial UE to a mobile communications network. For example, in LTE a UE performs certain steps before it can receive or transmit data. These steps can be categorized in cell search and cell selection, derivation of system information, and random access. After the initial access procedure, the terminal is able to receive and transmit its user data. Cell (re)selection may also be necessary after a radio link failure.

The assistance information transmitted in the RRC connection release message may for example comprise information identifying the location of candidate base stations such as neighbouring base stations and of the serving base station. For example, the infrastructure equipment may include information identifying any base station in its vicinity that might act as a candidate for random access trials of an aerial UE within the reception range of the system information. The information identifying the location of neighbouring base stations may for example comprise geographical coordinates, height and a cell ID of the respective base station. Still further the information identifying the location of neighbouring base stations may also comprise information identifying the location of the infrastructure equipment itself, e.g. the serving base station.

The assistance information transmitted in the RRC connection release message by the infrastructure equipment may comprise a frequency/cell priority list that is determined based on location of the user equipment and/or the location of candidate base stations such as neighbouring base stations or the serving base station. The frequency/cell priority list may for example identify several frequencies and/or several cells with specific priorities.

The circuitry of the infrastructure equipment may be configured to determine the frequency/cell priority list based on the distance between the user equipment and candidate cells.

The assistance information for cell selection/reselection transmitted by the infrastructure equipment may comprise information indicating whether or not a base station supports beam forming.

The assistance information for cell selection/reselection transmitted by the infrastructure equipment may comprise information identifying radio resources among uplink radio resources for which tilting of the main lobe is enabled.

The circuitry of the infrastructure equipment may be configured to transmit the RRC connection release message including assistance information to an aerial UE.

The circuitry of the infrastructure equipment may for example be configured to provide two sets of priority lists based on a user equipment's movement status for both broadcast and/or dedicated signaling. For example, a UE may be provided with two sets of priority lists in dedicated signaling (e.g. included in the assistance information for cell selection/reselection that is transmitted in the RRC connection release message) whereby one set is applicable when UE is airborne and another one when UE is a terrestrial UE. Alternatively, or in addition, a UE may be provided with two sets of priority lists in broadcast signaling whereby one set is applicable when the UE is airborne (aerial UE) and another one when UE is a terrestrial UE (e.g. an aerial UE that has landed on the ground).

The embodiments also disclose an electronic device comprising circuitry configured to receive and store assistance information for cell selection/reselection in an RRC connection release message, the assistance information being based on location information.

Circuitry of an electronic device (e.g. aerial UE) may include at least one of: a processor, a microprocessor, a dedicated circuit, a memory, a storage, a radio interface, a wireless interface, a network interface, or the like, e.g. typical electronic components which are included in a user equipment.

The assistance information received by the electronic device may comprise information identifying the location of candidate base stations such as neighbouring base stations or the serving base station.

The assistance information received by the electronic device may comprise a frequency/cell priority list that is determined based on the location of the user equipment and/or the location of candidate base stations such as neighbouring base stations or the serving base station.

The circuitry of the electronic device may be configured to determine the frequency/cell priority list based on the distance between the user equipment and candidate cells.

The assistance information for cell selection/reselection received by the electronic device may comprise information indicating whether or not a base station supports beam forming.

The assistance information for cell selection/reselection received by the electronic device may comprise information identifying radio resources among uplink radio resources for which tilting of the main lobe is enabled.

The circuitry of the electronic device may be configured to perform the cell selection/reselection based on the assistance information and according to a criterion.

The assistance information for cell selection/reselection received by the electronic device may comprise information identifying the location of base stations, and wherein the circuitry is further configured to determine respective distances between the electronic device and each base station identified in the assistance information.

The circuitry of the electronic device may further be configured to perform cell selection/reselection based on the distances between the electron device and the respective base stations.

The circuitry of the electronic device may further be configured to perform cell selection/reselection based on the assistance information if a criterion is fulfilled, and to perform conventional cell selection/reselection if the criterion is not fulfilled.

The criterion may for example depend on the height of the electronic device, on a current or a planned movement step of the electronic device, or on whether or not the electronic device is on the ground.

The circuitry may be configured to, when the electronic device is taking off or has the plan to take off, switch from using cell reselection information that is broadcast from an eNodeB with system information to using the assistance information for cell selection/reselection received in the RRC connection release message, or when the electronic device is landing or has the plan to land, switch from using the assistance information for cell selection/reselection received in the RRC connection release message to using cell reselection information that is broadcast from an eNodeB with system information, or vice versa. For example, when an aerial UE has the plan to take off, the aerial UE may use the cell reselection information provided in dedicated signal with idleModeMobilityControlInfo. However, when the aerial UE plans to stay on the ground and communicate with an eNodeB, the aerial UE may use the cell reselection information that is broadcast from eNodeB with system information. That is, the aerial may keep the priority list(s) received in dedicated signaling only while the UE is airborne.

The embodiments also disclose a method comprising transmitting or receiving an RRC connection release message including assistance information for cell selection/reselection, the assistance information being based on location information. The method may comprise any of the aspects described above with regard to the operation of an infrastructure equipment and with regard to an electronic device. The method may also comprise any of the aspects described below in more detail with regard to the operation of an eNB and/or a network entity, and with regard to an aerial UE of the embodiments.

The method may be a computer-implemented method.

In the present disclosure, a positioning based cell selection/reselection is thus proposed for aerial UEs. The positioning based cell selection/reselection reduces interference and allows aerial UEs to select the nearest base stations.

Aerial Cell Coverage

Cellular systems are designed by deploying eNBs so that each cell coverage for terrestrial UEs can be regarded as a unit for mobility management such as handover in connected mode or cell selection/reselection in idle mode. This cell coverage for terrestrial UEs can be treated as static coverage provided by transmission of cell specific reference signal (CRS) or Common Reference Signal.

Areal cell coverage for aerial UEs can be a static coverage similar to that for terrestrial UEs. However, from a perspective of minimization of interference to neighbouring cells and efficient usage of radio resources, areal cell coverage for aerial vehicles can be provided in a dynamic manner.

In the embodiments described below in more detail, the term "areal cell coverage" is used to refer to a second coverage ("aerial cell coverage") that is provided by an eNB to aerial UEs, in addition to a first coverage (or "terrestrial cell coverage") that is provided by the eNB to terrestrial UEs.

FIG. 1 discloses an embodiment in which an eNB 100 that is designed based on currently deployed base stations for cellular systems builds a different type of cell coverage ("aerial cell coverage") for aerial UEs in addition to the normal cell coverage ("terrestrial cell coverage") for terrestrial UEs. In FIG. 1, eNB 100 provides terrestrial UEs 102, 103 with a cell coverage 120 for terrestrial UEs and eNB 100 provides an aerial vehicle 104 comprising an aerial UE with a cell coverage 140 for aerial UEs. This "areal cell coverage" may adapt to the varying size of coverage provided by eNB 100 depending on the height 106 of flying aerial vehicle 104.

As the number of visible cells may depend on the height 106 of aerial vehicle 104, in connected mode, the transmission power from eNB 100 and/or from aerial vehicle 104 may be controlled depending on the height of aerial vehicle 104. For example, the transmission power from eNB 100 and/or from aerial vehicle 104 may be controlled in a way that the area of areal cell coverage provided by eNB 100 remains almost the same size regardless of the height 106 of aerial vehicle 104. Accordingly, the same deployment philosophy for mobility management may be applied regardless of height of aerial vehicle 104. This may allow eNBs to be geometrically deployed so that efficient mobility can be performed.

Most of the aerial UEs are equipped with a GNSS (Global Navigation Satellite System) like GPS or any other accurate positioning function. In order to allow for a dynamic control of the areal cell coverage provided by the eNB, an aerial vehicle 104 may report its altitude (height) to eNB 100. For example, aerial vehicle 104 can report a value of altitude measured via GPS (Global Positioning System) or a height measured via pressure sensor to eNB 100. The eNB may have a database storing a relation between areal cell coverage and the coordination of eNB position. For example, the site information database stores the cell ID, eNB coordination, cell radius, transmission power, antenna configuration, and so on. This information is originally for terrestrial cell coverage, but it could be useful for areal carrier. When an eNB receives the position of an aerial vehicle, the eNB calculates the cell coverage area according to the information in the database. Then, the eNB checks whether the aerial vehicle is within the calculated cell coverage area or not. Alternatively, the UE may receive a subset of that database in a neighbor area of its current position from the network in advance. For example, the site database may accommodate all eNBs information. It may be too large to store in the UE. The site database picks up the information of nearest eNB from the current aerial vehicle position and its neighbor eNBs of the nearest eNB, which is called here a "neighbor area". The eNB may send the selected eNBs information from the data base to aerial vehicle. The aerial vehicle may calculate the cell coverage of a nearest eNB and its neighbor eNBs as well. This may be the calculated cell coverage, also called "zone".

An eNB as described above may thus have the latest/accurate location of aerial UEs. eNBs regularly update the location information to a location server of aerial UEs. A location server may provide this information to an external server of air traffic control. Vice versa, the external server might send the information/direction from traffic control to aerial UE via eNB.

Arial UEs After Radio Link Failure (RLF)

Base stations are normally designed for the use with terrestrial UEs and are normally not specifically deployed for aerial UEs, e.g. by taking care of effects from buildings or some obstacles. That is, aerial UEs may have a higher possibility to face radio link failures as compared to terrestrial UEs.

In general, in the case that a UE faces a radio link failure (RLF), the UE initiates the RRC connection re-establishment procedure, provided that security is active. If security is not active when RLF occurs, the UE moves to idle mode.

To attempt the RRC connection re-establishment procedure, the UE starts T311 timer and performs cell selection. However, as described in 3GPP TSG-RAN R2-1710796, it is possible that the aerial UE receives the system information from a base station that is not the nearest one.

Cell selection without taking care specially for aerial UEs could thus result in that during cell selection an aerial UE does not select the nearest base station. This might generate interference problems for an aerial UE or the terrestrial UE in the random access procedure, i.e. the aerial UE or another terrestrial UE, due to the interference problems, might have difficulties to send an RRCConnectionReestablishmentRequest message.

Figure 2:
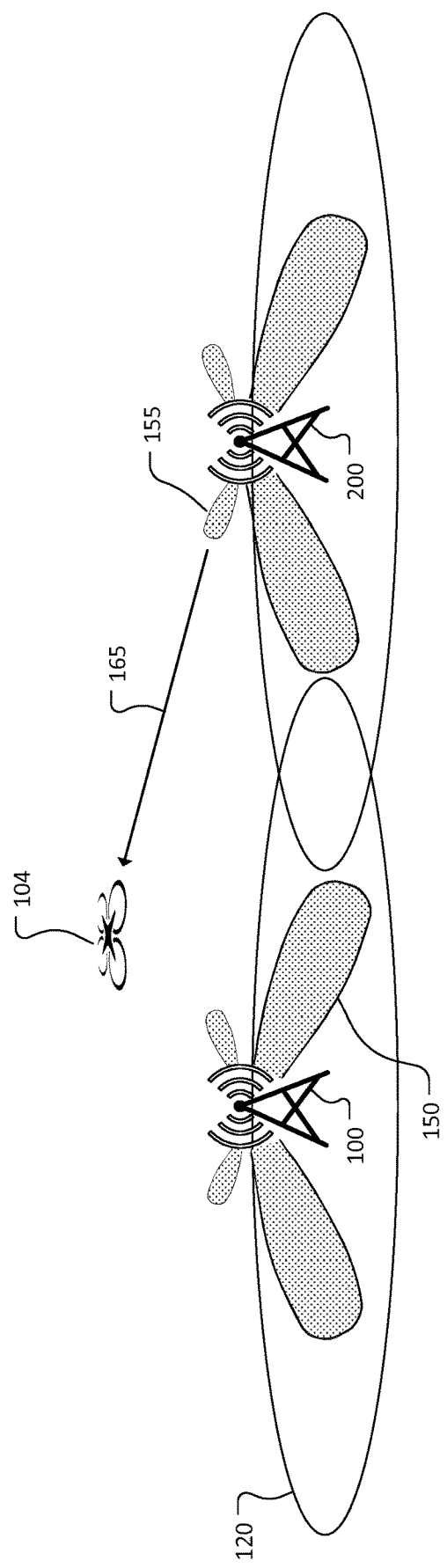
FIG. 2 schematically shows an aerial UE that selects a neighbouring base station as a serving cell according to a conventional cell selection/reselection.

FIG. 2 schematically shows an aerial UE that selects a neighbouring base station as a serving cell according to a conventional cell selection/reselection. As shown in FIG. 2, an aerial UE 104 may select a neighbouring base station 200 as a serving cell according to a conventional cell selection/reselection and receive the system information from this neighbouring base station 200 via side lobe 155, i.e. not from a nearest base station 100 via its main lobe 150. If the aerial UE 104 performs connection establishment or connection re-establishment based on this conventional cell selection/reselection, the aerial UE 104 starts random access transmission towards the neighbouring base station 200. Since a transmission power on this random access could be higher than that from a terrestrial UE, so as to reach to the neighbouring base station, this may cause serious interference to terrestrial UEs in the coverage of a base station 100 and the neighbouring base station 200.

This may be a similar issue as the issue which is known as "Chiba" issue from terrestrial UEs. The "Chiba" issue is described, for example, in 3GPP TSG-RAN R2-1710796 ("Our view on the "Chiba issue"—RACH access failure"), WG2 Meeting #82, R2-131654, Fukuoka, Japan, 20-24 May 2013. In the "Chiba" issue, it is considered the specific case that the downlink quality is better than the uplink quality. In such a case, even if a terrestrial UE could receive enough down link quality from a base station, a random access transmission transmitted by the terrestrial UE might be too week to reach the base station/cell selected by cell selection. This could for example happen due to a large mismatch between uplink and downlink quality (i.e. poor reciprocity). One of solution for the "Chiba" issue is that the number of random access retransmissions is limited to a maximum number. A selected cell will be changed to the next higher ranking cell after the number of random access trials reaches the maximum number. As the current deployment of base stations has not considered introduction of the aerial UEs, this kind of large mismatch between uplink and downlink due to directivity of the antenna towards the aerial UEs may frequently happen. This may in particular happen because communication via a side lobe may be expected to have worse reciprocity than that via a main lobe.

Assistance Information within an RRC Connection Release Message

As described above in more detail, it can here be assumed that most of the aerial UEs are equipped with a GNSS (Global Navigation Satellite System) like GPS or any other accurate positioning function.

FIG. 3 shows an embodiment of an RRC Connection Release message including CellSelectAssistence Information to allow a positioning based cell selection.

The RRC Connection Release message comprises a ReleaseCause IE, which is used to indicate the reason for releasing the RRC Connection (i.e. loadBalancingTAUrequired, cs-FallbackHighPriority, or other).

The RRC Connection Release message further comprises a RedirectedCarrierInfo IE, which indicates a carrier frequency which is used to redirect the UE to an E-UTRA or an inter-RAT carrier frequency.

The RRC Connection Release message further comprises an IdleModeMobilityControlInfo IE, which provides dedicated cell reselection priorities. As shown, this IE contains an IE called CellSelectAssistenceInfo. This IE idleModeMobilityControlInfo may comprise assistance positioning information, e.g. location information of candidate base stations such as neighbor base stations or the serving cell location, as it is described in more detail below with regard to FIG. 5.

The RRC Connection Release message further comprises a cellInfoList IE, which is used to provide system information of one or more cells on the redirected inter-RAT carrier frequency. The system information can be used if, upon redirection, the UE selects an inter-RAT cell indicated by the physCellId and carrierFreq (GERAN) or by the physCellId (other RATs).

The RRC Connection Release message further comprises an ExtendedWaitTime. This is applicable when the connection is being established by a UE which has been configured for 'low priority NAS signalling', e.g. machine to machine type communications. The IE can for example save a value between (1 to 1800 seconds).

The UE may use the received assistance positioning information to perform positioning based cell selection/reselection.

The network may for example send the RRC connection release message to an aerial UE in the case that the anal UE has no data to transmit from and to network, i.e. an inactivity timer expires. Alternatively, the network may for example send the RRC connection release message to an aerial UE when the aerial UE experiences a radio link failure (RLF), or when the aerial UE experiences an RRC connection re-establishment failure. Still alternatively, the network may send the RRC connection release message to an aerial UE when the network detects that certain aerial UEs cause severe interferences to other UEs, or during detach. The positioning based cell selection/reselection can be (and beneficially) applied in any case as stated above.

In the embodiment above, the IE idleModeMobilityControlInfo comprises the assistance positioning information. In other embodiments, the assistance positioning information can be included as a separate IE contained in the RRC connection release message from network to UE.

idleModeMobilityControlInfo with Assistance Information

The IE idleModeMobilityControlInfo in the RRC connection release message is typically used to provide the UE with cell reselection priorities for each frequency. In the embodiments described here, it is foreseen to include assistance information in addition to (or alone) such absolute priority lists in order to allow the positioning based cell reselection. The network can thus provide the dedicated cell reselection priorities for frequencies which are not configured by system information.

FIG. 4 shows an embodiment in which CellSelectAssistenceInfo is contained in the IE idleModeMobilityControlInfo. In this embodiment, the IE idleModeMobilityControlInfo comprises a E-UTRA-FrequencyPriorityList, which contains the frequencies preferred for E-UTRA. Still further, the IE idleModeMobilityControlInfo comprises a GERAN-FrequencyPriorityList, which contains the frequencies preferred for GERAN. Still further, the IE idleModeMobilityControlInfo comprises an FDD-UTRA-FrequencyPriorityList, which contains the frequencies preferred for FDD-UTRA. Still further, the IE idleModeMobilityControlInfo comprises a TDD-UTRA-FrequencyPriorityList, which contains the frequencies preferred for TDD-UTRA. Still further, the IE idleModeMobilityControlInfo comprises a HRDP-CDMA2000-BandClassPriorityList, which contains the frequency bands preferred for HRDP-CDMA2000. Still further, the IE idleModeMobilityControlInfo comprises a 1×RTT-CDMA2000-BandClassPriorityList, which contains the frequency bands preferred for 1×RTT-CDMA2000. In addition to these priority lists, the IE idleModeMobilityControlInfo comprises a CellSelectAssistenceInfo IE which contains assistance information for cell selection/reselection. This assistance information is explained in more detail with regard to FIG. 5 below.

FIG. 5 shows an embodiment of assistance information for cell selection that is transmitted e.g. as in CellSelectAssistenceInfo IE in an idleModeMobilityControlInfo IE of an RRC Connection Release message from a base station (e.g. neighbouring base station 200 in FIG. 2) to an aerial UE (e.g. 104 in FIG. 2). The CellSelectAssistenceInfo comprises an information element BaseStation1 that describes a first base station, an information element BaseStation2 that describes a second base station, and an information element BaseStation3 that describes a third base station. Information element BaseStation1 comprises an information element cellID that describes the cell id of the first base station and thus uniquely identifies the first bases station. Information element BaseStation1 further comprises information elements latitude, longitude and height that describe the geographical location of the first base station. Information element BaseStation2 comprises an information element cellID that describes the cell id of the second base station and thus uniquely identifies the first base station. Information element BaseStation2 further comprises information elements latitude, longitude and height that describe the geographical location of the second base station. Information element BaseStation3 comprises an information element cellID that describes the cell id of the third base station and thus uniquely identifies the third base station. Information element BaseStation3 further comprises information elements latitude, longitude and height that describe the geographical location of the third base station.

If the RRC Connection Release message for the aerial UEs comprises, as described above, assistance information for identifying base stations that are in its vicinity, an aerial UE, based on this assistance information and based on a position information detected by the GNSS or any other accurate positioning function of the aerial UE can perform a cell selection/reselection procedure according to the assistance information. For example, for an aerial UE the cell selection/reselection can be based on the distance between the aerial UE and each base station identified in the assistance information.

Below, some scenarios of using the assistance information in the RRC Connection Release message are described.

If there is cell coverage on the ground when the aerial UE is landing on the ground, the aerial UE can receive system information from eNodeB. However, the system information of cell reselection for terrestrial UEs as submitted in the system information may not be suitable for aerial UEs because aerial UE cell coverage design over the ground is quite different from terrestrial cell coverage on the ground. Hence, in this case, the aerial UE may decide to use the assistance information for cell reselection received with the idleModeMobilityControlInfo instead of the system information for cell reselection as transmitted to terrestrial UEs.

For example, an aerial UE may use a lower band because of wide coverage if there is more than one bands. As another example, an aerial UE may decide, based on the assistance information for cell reselection received with the idleModeMobilityControlInfo, to use a specific band which support 3D MIMO/beamforming. Or, as another example, the aerial UE may use a light load cell rather than a congested high load cell. Such information can be indicated in the assistance information as well, during RRC connection release e.g. in the idleModeMobilityControlInfo or provided via a dedicated IE.

The assistance information that is transmitted as cell reselection criteria to an aerial UE may indicate not only the location of eNodeBs, but also indicate the preferable frequency or preferable eNodeB/cell which can easily support aerial UEs.

For example, an aerial UE that is on the ground and that can communicate with an eNodeB may use the same cell reselection as normal UEs. Thus, the aerial UE on the ground may use the same carrier frequency priority as normal (terrestrial) UEs. However, an aerial UEs on the ground may use a different RAT (e.g. NR) for ground communication, and/or a specific carrier frequency priority. This specific RAT that an aerial UEs on the ground should use may be indicated to the aerial UE within the idleModeMobilityControlInfo.

According to another example, an aerial UE may select to use the assistance info for cell reselection depending on the next movement step. For example, when UAV has the plan to take off, the aerial UE may use the cell reselection information provided with idleModeMobilityControlInfo. However, when the aerial UE plans to stay on the ground and communicate with an eNodeB, the aerial UE may use the cell reselection information that is broadcast from eNodeB with system information.

As yet another example, an eNB may estimate the UE behavior (e.g. if the aerial UE is descending) and then decide to send to the aerial UE idleModeMobilityControlInfo with assistance information.

Figure 6:
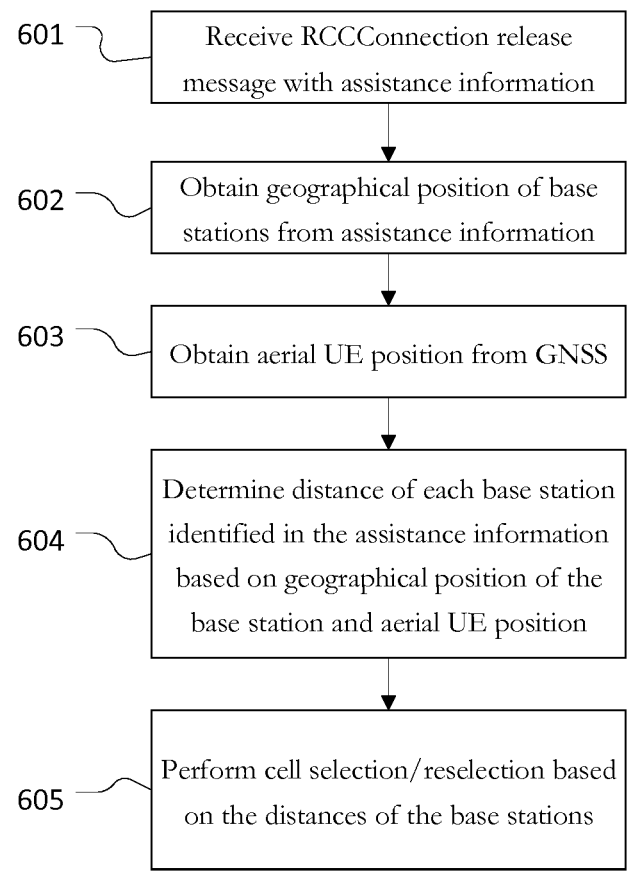
FIG. 6 shows an exemplifying process of performing the cell selection/reselection based on assistance information obtained within system information.

FIG. 6 shows an exemplifying process of performing the cell selection/reselection based on assistance information obtained within system information. At 601, an aerial UE receives a RRC Connection Release message with assistance information from a base station. The base station may for example be a base station which has a good downlink quality. At 602, the aerial UE obtains the geographical position of base stations identified in the assistance information. At 603, the aerial UE obtain its own position as aerial UE position from GNSS. At 604, the aerial UE determines the distance of each base station identified in the assistance information based on the geographical position of the base station and the aerial UE position (its own position). At 605, the aerial UE performs cell selection/reselection based on the distances of the base stations.

Here, this selection scheme based on distance between the aerial UE and each base station can be applied to a measurement for mobility management in connected mode. In this case, a criteria for the aerial UE to select candidate target base stations/cells for measurement can be configured via an RRC Connection Reconfiguration message upon connection establishment or handover procedure.

If the RRC Connection Release message for the aerial UEs includes the assistance information, as described above, this allows the nearest base station to receive the random access transmitted from the aerial UE via a main lobe as far as possible. That is, other than in the case where an aerial UE performs cell selection/reselection to identify the nearest base station and sends RRCConnectionReestablishmentRequest message without any care if it is an aerial UE or not, if assistance information for aerial UEs is taken into account, the random access to send this message does not cause interference as mentioned above, since the nearest base station is able to receive this random access transmission via a main lobe.

Furthermore, the RRC Connection Release message for the aerial UEs can include, as assistance information, an information on maximum power or maximum retransmissions for sending a random access message such as RRC Connection Reestablishment Request message or the like from the aerial UE.

Determining the Preferred Cell List in the RRC Connection Release Message

This embodiment below describes an embodiment of determining the preferred cell list in the RRC Connection Release message. In the case that operators may have concerns on opening the positioning information of base stations to the public by including this information explicitly into RRC Connection Release message as described in the embodiment above, the preferred cell list that is included in the RRC connection release message may be modified to take into account location information of the aerial UE and/or location information from the base station and/or neighboring base stations. If for example, the network can get the aerial UE's position information, i.e. from UE periodic reporting, or from the UE sending UL mobility reference signals and coordination with other base stations, or if the network gets the UE's positioning information from a location server, the network can combine this information with own knowledge on the positioning information of neighboring base station, the network can calculate a preferred cell list based on e.g. the distance between the UE and the base stations. Those base stations at short distance of the UE will be selected as preferred cells and the network will send a respective priority list to the aerial UE within the RRC connection release message. The priority list may for example be any of the priority lists described with regard to FIG. 4 above, such as E-UTRA-FrequencyPriorityList, GERAN-FrequencyPriorityList, FDD-UTRA-FrequencyPriorityList, TDD-UTRA-FrequencyPriorityList, HRDP-CDMA2000-BandClassPriorityList, 1xRTT-CDMA2000-BandClassPriorityList, or the like. As a consequence for the aerial UE, those preferred cells will have a higher priority to be selected as the serving cell during the selection/reselection procedure.

Figure 7:
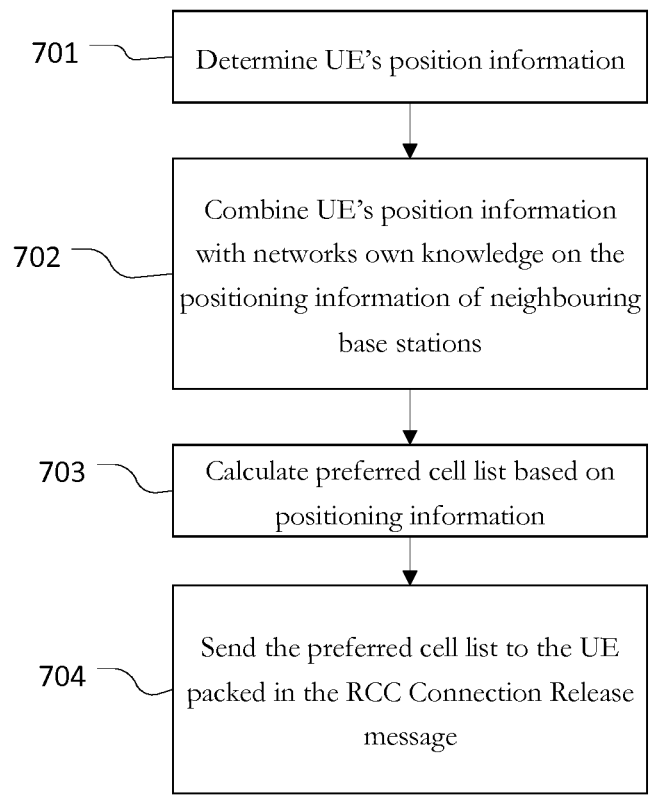
FIG. 7 shows a second embodiment in which the network calculates a preferred cell list and transmits it to the UE.

FIG. 7 shows an embodiment of a method in which the network calculates a preferred cell list and transmits it to the UE. In 701, the network determines the UE's position. As mentioned above this can be done by the evaluation of UE periodic reporting, or received from the UE sending UL mobility reference signal and coordination with other base stations or to get the UE's positioning information from location server. In 702, the network combines the UE's position information with the network's own knowledge on the positioning information of neighbouring base stations. In 703, the network calculates a preferred cell list, similar to the preferred cell list calculated above in the first embodiment. At 704, the preferred cell list is sent to the UE packed in a RRC Connection Release message. According to this preferred cell list, the UE may now select/reselect a base station during cell selection/reselection procedure.

Implementation

Figure 8:
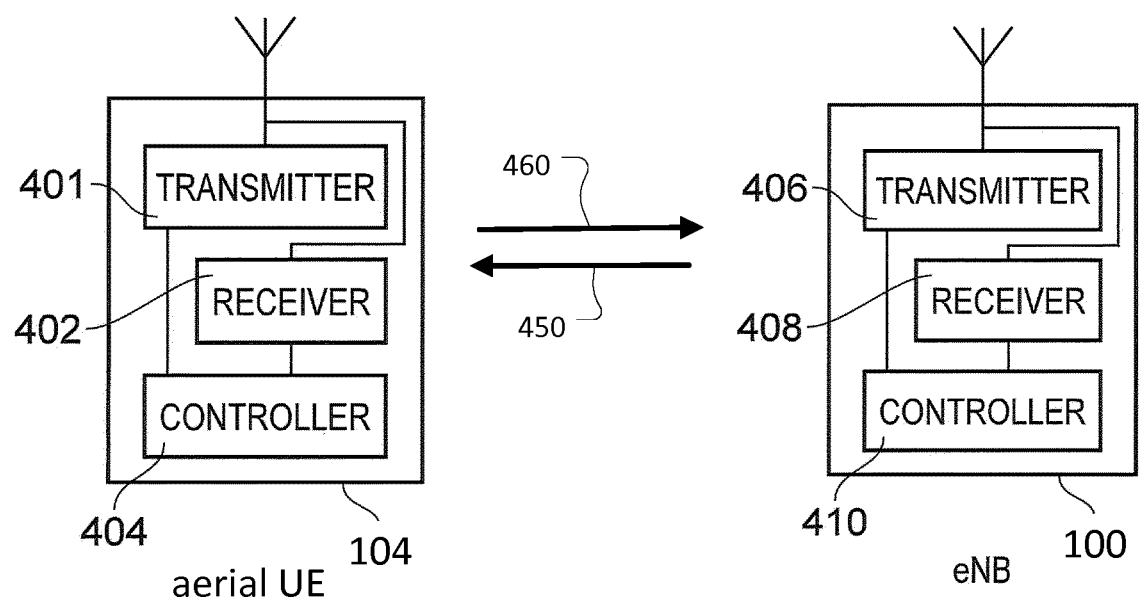
FIG. 8 shows an embodiment of a controller for a UE or for an eNB.

FIG. 8 shows a schematic block diagram of a communications path between an aerial UE 104 and an eNB 102. The aerial UE 104 includes a transmitter 401 a receiver 402 and a controller 404 to control the transmission of signals to the eNB 100 and the reception. The up-link signals are represented by an arrow 460 which corresponds to that shown in FIG. 1 of signals from eNB 100. Downlink signals are shown by an arrow 450. The eNB 100 includes a transmitter 404 a receiver 408 and a controller 410 which may include a scheduler for scheduling the transmission and reception of signals on the downlink and the uplink in accordance with a wireless access interface.

Figure 9:
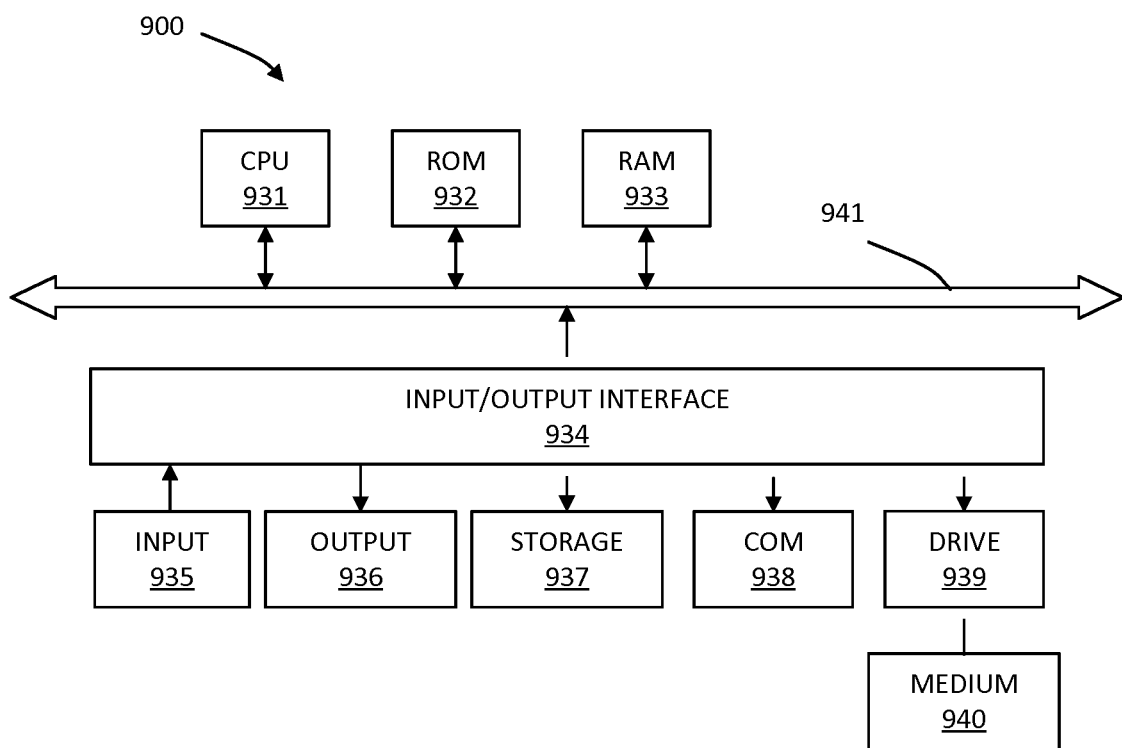
FIG. 9 presents a message flow diagram of a current handover procedure for LTE.

An embodiment of a controller 900 is described under reference of FIG. 9. This controller 900 can be implemented such that it can basically function as any type of apparatus or entity, base station or new radio base station, transmission and reception point, or user equipment as described herein. The controller 900 has components 931 to 940, which can form a circuitry, such as any one of the circuitries of the entities, base stations, and user equipment, as described herein.

Embodiments which use software, firmware, programs or the like for performing the methods as described herein can be installed on controller 900, which is then configured to be suitable for the concrete embodiment.

The controller 900 has a CPU 931 (Central Processing Unit), which can execute various types of procedures and methods as described herein, for example, in accordance with programs stored in a read-only memory (ROM) 932, stored in a storage 937 and loaded into a random access memory (RAM) 933, stored on a medium 940, which can be inserted in a respective drive 939, etc.

The CPU 931, the ROM 932 and the RAM 933 are connected with a bus 941, which in turn is connected to an input/output interface 934. The number of CPUs, memories and storages is only exemplary, and the skilled person will appreciate that the controller 900 can be adapted and configured accordingly for meeting specific requirements which arise when it functions as a base station, and user equipment.

At the input/output interface 934, several components are connected: an input 935, an output 936, the storage 937, a communication interface 938 and the drive 939, into which a medium 940 (compact disc, digital video disc, compact flash memory, or the like) can be inserted.

The input 935 can be a pointer device (mouse, graphic table, or the like), a keyboard, a microphone, a camera, a touchscreen, etc. The output 936 can have a display (liquid crystal display, cathode ray tube display, light emittance diode display, etc.), loudspeakers, etc. The storage 937 can have a hard disk, a solid state drive and the like.

The communication interface 938 can be adapted to communicate, for example, via a local area network (LAN), wireless local area network (WLAN), mobile telecommunications system (GSM, UMTS, LTE, etc.), Bluetooth, infrared, etc. When the controller 900 functions as a base station, the communication interface 938 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the controller 900 may have one or more antennas and/or an antenna array. The present disclosure is not limited to any particularities of such protocols.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding.

It should also be noted that the division of the control or circuitry of FIG. 9 into units 931 to 940 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An infrastructure equipment comprising circuitry configured to transmit to a user equipment an RRC connection release message including assistance information for cell selection/reselection, the assistance information being based on location information.

(2) The infrastructure equipment of (1), wherein the assistance information comprises information identifying the location of candidate base stations.

(3) The infrastructure equipment of anyone of (1) to (2), wherein the assistance information comprises a frequency/cell priority list that is determined based on location of the user equipment and/or the location of candidate base stations.

(4) The infrastructure equipment of (3), wherein the circuitry is configured to determine the frequency/cell priority list based on the distance between the user equipment and candidate cells.

(5) The infrastructure equipment of anyone of (1) to (2), wherein the assistance information for cell selection/reselection comprises information indicating whether or not a base station supports beam forming.

(6) The infrastructure equipment of anyone of (1) to (6), wherein the assistance information for cell selection/reselection comprises information identifying radio resources among uplink radio resources for which tilting of the main lobe is enabled.

(7) The infrastructure equipment of anyone of (1) to (6), wherein the circuitry is configured to transmit the RRC connection release message including assistance information to an aerial UE.

(8) The infrastructure equipment of anyone of (1) to (7), wherein the circuitry is configured to provide two sets of priority lists based on the user equipment's movement status for both broadcast and/or dedicated signaling.

(9) An electronic device comprising circuitry configured to receive and store assistance information for cell selection/reselection in an RRC connection release message, the assistance information being based on location information.

(10) The electronic device of (9), wherein the assistance information comprises information identifying the location of candidate base stations.

(11) The electronic device of (9), wherein the assistance information comprises a frequency/cell priority list that is determined based on the location of the user equipment and/or the location of candidate base stations.

(12) The electronic device of (11), wherein the circuitry is configured to determine the frequency/cell priority list based on the distance between the user equipment and candidate cells.

(13) The electronic device of anyone of (9) to (12), wherein the assistance information for cell selection/reselection comprises information indicating whether or not a base station supports beam forming.

(14) The electronic device of anyone of (9) to (13), wherein the assistance information for cell selection/reselection comprises information identifying radio resources among uplink radio resources for which tilting of the main lobe is enabled.

(15) The electronic device of anyone of (9) to (14), wherein the circuitry is configured to perform the cell selection/reselection based on the assistance information and according to a criterion.

(16) The electronic device of anyone of (9) to (15), wherein the assistance information for cell selection/reselection comprises information identifying the location of base stations, and wherein the circuitry is further configured to determine respective distances between the electron device and each base station identified in the assistance information.

(17) The electronic device of anyone of (9) to (16), wherein the circuitry is further configured to perform cell selection/reselection based on the distances between the electronic device and the respective base stations.

(18) The electronic device of anyone of (9) to (17), wherein the circuitry is configured to perform cell selection/reselection based on the assistance information if a criterion is fulfilled, and to perform conventional cell selection/reselection if the criterion is not fulfilled.

(19) The electronic device of (18), wherein the criterion depends on the height of the electronic device, on a current or a planned movement step of the electronic device, or on whether or not the electronic device is on the ground.

(20) The electronic device of anyone of (9) to (19), wherein the circuitry is configured to,
when the electronic device is taking off or has the plan to take off, switch from using cell reselection information that is broadcast from an eNodeB with system information to using the assistance information for cell selection/reselection received in the RRC connection release message, or
when the electronic device is landing or has the plan to land, switch from using the assistance information for cell selection/reselection received in the RRC connection release message to using cell reselection information that is broadcast from an eNodeB with system information.

(21) The electronic device of anyone of (9) to (19), wherein the circuitry is configured to,
when the electronic device is taking off or has the plan to take off, switch from using the assistance information for cell selection/reselection received in the RRC connection release message to using cell reselection information that is broadcast from an eNodeB with system information, or
when the electronic device is landing or has the plan to land, switch from using cell reselection information that is broadcast from an eNodeB with system information to using the assistance information for cell selection/reselection received in the RRC connection release message.

(22) The electronic device of anyone of (9) to (21), wherein the electronic device is an aerial UE.

(23) A method comprising transmitting or receiving an RRC connection release message including assistance information for cell selection/reselection, the assistance information being based on location information.

(24) A computer program causing a computer and/or a processor and/or a circuitry to perform the method of (22), when being carried out on the computer and/or processor and/or circuitry.

(25) A non-transitory computer-readable recording medium storing a computer program product causing a computer and/or a processor and/or a circuitry to perform the method of (22) when being carried out on a computer and/or processor and/or circuitry.

The invention claimed is:

1. An infrastructure equipment, comprising:
circuitry configured to
transmit, to a user equipment, a radio resource control (RRC) connection release message including assistance information for cell selection/reselection, the assistance information being based on location information indicating a location of the user equipment and/or a location of a candidate base station; and
provide, based on a movement status of the user equipment, a first priority list for broadcast signaling and/or a second priority list for dedicated signaling.

2. The infrastructure equipment of claim 1, wherein the assistance information comprises information identifying plural locations of plural candidate base stations.

3. The infrastructure equipment of claim 1, wherein the assistance information comprises a frequency/cell priority list that is determined based on the location information.

4. The infrastructure equipment of claim 3, wherein the circuitry is configured to determine the frequency/cell priority list based on a distance between the user equipment and candidate cells.

5. The infrastructure equipment of claim 1, wherein the assistance information comprises information indicating whether or not a base station supports beam forming.

6. The infrastructure equipment of claim 1, wherein the assistance information comprises information identifying radio resources among uplink radio resources for which tilting of a main lobe is enabled.

7. The infrastructure equipment of claim 1, wherein the circuitry is configured to transmit the RRC connection release message including assistance information to an aerial user equipment.

8. An electronic device, comprising:
circuitry configured to
receive and store assistance information for cell selection/reselection in a radio resource control (RRC) connection release message, the assistance information being based on location information indicating a location of the electronic device and/or a location of a candidate base station;
receive a first priority list for broadcast signaling, and/or a second priority list for dedicated signaling, the first priority list and the second priority list being based on a movement status of the electronic device; and
perform a cell selection/reselection based on the assistance information, wherein
the electronic device stores the first priority list and the second priority list only while airborne.

9. The electronic device of claim 8, wherein the assistance information comprises information identifying plural locations of plural candidate base stations.

10. The electronic device of claim 8, wherein the assistance information comprises a frequency/cell priority list that is determined based on the location information.

11. The electronic device of claim 10, wherein the circuitry is configured to determine the frequency/cell priority list based on a distance between the electronic device and candidate cells.

12. The electronic device of claim 8, wherein
the assistance information comprises information identifying locations of base stations, and
the circuitry is further configured to determine respective distances between the electronic device and each base station identified in the assistance information.

13. The electronic device of claim 12, wherein the circuitry is further configured to perform the cell selection/reselection based on the distances between the electronic device and the respective base stations.

14. The electronic device of claim 8, wherein the circuitry is configured to
perform the cell selection/reselection based on the assistance information in a case that a criterion is fulfilled, and
perform conventional cell selection/reselection in a case that the criterion is not fulfilled.

15. The electronic device of claim 14, wherein the criterion is a condition relating to a height of the electronic device, a current or a planned movement step of the electronic device, or whether or not the electronic device is on the around.

16. The electronic device of claim 8, wherein the circuitry is configured to
in a case that the electronic device is taking off or has a plan to take off, switch from using cell reselection information that is broadcast from an eNodeB with system information to using the assistance information for cell selection/reselection received in the RRC connection release message, or
in a case that the electronic device is landing or has a plan to land, switch from using the assistance information for cell selection/reselection received in the RRC connection release message to using cell reselection information that is broadcast from an eNodeB with system information.

17. The electronic device of claim 8, wherein the circuitry is configured to
in a case that the electronic device is taking off or has a plan to take off, switch from using the assistance information for cell selection/reselection received in the RRC connection release message to using cell reselection information that is broadcast from ail eNodeB with system information, or
in a case that the electronic device is landing or has a plan to land, switch from using cell reselection information that is broadcast from an eNodeB with system information to using the assistance information for cell selection/reselection received in the RRC connection release message.

18. A method, comprising:
transmitting, by an infrastructure equipment to a user equipment, a radio resource control (RRC) connection release message including assistance information for cell selection/reselection, the assistance information being based on location information indicating a location of the user equipment and/or a location of a candidate base station; and
providing, based on a movement status of the user equipment, a first priority list for broadcast signaling and/or a second priority list for dedicated signaling.

* * * * *